US009267836B2

(12) United States Patent
Kraus

(10) Patent No.: US 9,267,836 B2
(45) Date of Patent: Feb. 23, 2016

(54) METHOD FOR ADJUSTING A TARE WEIGHT OF AN AGRICULTURAL BALER TO REFLECT USAGE OF PRESERVATIVE IN TREATING FORMED BALE

(71) Applicant: Timothy J. Kraus, Blakesburg, IA (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 318 days.

(21) Appl. No.: 13/633,930

(22) Filed: Oct. 3, 2012

(65) Prior Publication Data

US 2014/0090903 A1 Apr. 3, 2014

Related U.S. Application Data

(62) Division of application No. 12/915,330, filed on Oct. 29, 2010, now Pat. No. 8,326,563.

(51) Int. Cl.

| | |
|---|---|
| ***A01F 15/07*** | (2006.01) |
| ***A01F 15/08*** | (2006.01) |
| ***G01G 19/12*** | (2006.01) |
| ***G01G 23/01*** | (2006.01) |
| ***G01G 9/00*** | (2006.01) |
| ***G01G 17/04*** | (2006.01) |

(52) U.S. Cl.
CPC .............. *G01G 9/00* (2013.01); *A01F 15/0833* (2013.01); *G01G 19/12* (2013.01); *G01G 23/01* (2013.01); *A01F 15/071* (2013.01); *A01F 15/0816* (2013.01); *A01F 2015/0808* (2013.01); *G01G 17/04* (2013.01)

(58) Field of Classification Search
CPC .................... A01F 15/0875; A01F 2015/0891; A01F 15/0816; A01F 15/0833; A01F 15/071; A01F 2015/0808; G01G 19/12; G01G 23/3707; G01G 23/01; G01G 17/04; G01G 9/00; G01F 23/02; G01F 23/20; G01F 23/205
USPC ............. 177/1, 136, 137; 53/502; 100/35, 48, 100/87, 88; 702/101, 102; 73/1.13, 1.15, 73/334; 56/10.2 R
See application file for complete search history.

(56) References Cited

U.S. PATENT DOCUMENTS

| | | | | | |
|---|---|---|---|---|---|
| 670,161 | A | * | 3/1901 | Olrich | 73/325 |
| 2,294,473 | A | * | 9/1942 | Makeley | 229/162.2 |
| 4,133,287 | A | * | 1/1979 | Downs | 116/227 |
| 4,277,833 | A | * | 7/1981 | Steffen | 702/128 |
| 4,352,267 | A | * | 10/1982 | Mellinger | A01F 15/0816 100/71 |
| 4,409,845 | A | * | 10/1983 | Stufflebam et al. | 73/861 |
| 4,465,211 | A | * | 8/1984 | van der Lely et al. | 222/166 |
| 4,491,023 | A | * | 1/1985 | Graef | 73/861 |
| 4,491,190 | A | * | 1/1985 | Mayfield | 177/139 |
| 4,583,605 | A | * | 4/1986 | Hirano | 177/50 |

(Continued)

FOREIGN PATENT DOCUMENTS

EP 2745675 A1 * 6/2014 ............. A01F 15/08

*Primary Examiner* — Randy W Gibson

(57) ABSTRACT

A method is provided for determining the weight of an agricultural bale that compensates for un-level terrain such as hillsides. The method uses an empty baler tare weight and a full baler weight to determine a raw bale weight. The cosine of the slope upon which the baler sits is then calculated based upon the empty baler weight as it sits and the empty baler tare weight. The cosine of the angle of slope and raw bale weight are then used to determine an actual bale weight. Further steps are provided for compensating in the tare weight of the baler for the weight of wrapping material and/or preservative consumed in the formation of each bale.

1 Claim, 5 Drawing Sheets

Start 500
501 Determine and record $W_t$ while the baler is on a level surface.
502 Record $W_{wrap}$ in lb/ft² for net and in lbs/ft for twine and record $W_{pres.}$ in lbs/ft³ for preservative;
503 Record Wrapping Material Width $M_w$.
504 Commence baling process.
505 Is bale complete? No / Yes
506 Weigh baler to determine $W_f$ and record.
507 Determine and record the bale diameter $B_d$.
508 Determine and record the number of wraps $N_w$ of the net or twine material used.
509 Calculate $W_n$ wherein: for net: $W_n = \pi * B_d * M_w * N_w * W_{wrap}$ for twine: $W_n = \pi * B_d * N_w * W_{wrap}$.
512 Determine and record raw bale weight $W_r$ wherein: $W_r = W_f - W_t$.
513 Calculate $W_p$ wherein: $W_p = W_{pres.} * V_p$.
514 Determine and record Cos *A*. Wherein Cos $A = W_e / W_t$.
515 Determine $W_a$. Wherein $W_a = W_r / \cos A$.
516 Communicate $W_a$ to display.
517 Determine new empty baler tare weight $W_t'$ Wherein: $W_t' = W - (W_n + W_t)$.
518 Let $W_t = W_t'$.

(56) References Cited

U.S. PATENT DOCUMENTS 4,663,960 A * 5/1987 Makkink ........................ 73/1.36
4,742,880 A 5/1988 Schrag et al.
4,770,039 A * 9/1988 Nagashima ..................... 73/323
4,796,782 A * 1/1989 Wales et al. ..................... 222/57
4,855,924 A * 8/1989 Strosser et al. ............... 700/117
4,916,888 A 4/1990 Sheehan et al.
4,918,910 A 4/1990 Sheehan et al.
5,161,628 A * 11/1992 Wirth ............................ 177/137
5,631,826 A * 5/1997 Chow .............................. 700/84
6,023,666 A * 2/2000 Jiang et al. .................... 702/173
6,061,608 A * 5/2000 Moldavsky ................... 700/240
6,313,414 B1 11/2001 Campbell
6,378,276 B1 4/2002 Dorge et al.
6,457,295 B1 * 10/2002 Arnold ............................ 53/211
6,615,656 B1 * 9/2003 Breed et al. ................. 73/290 R
6,774,805 B1 * 8/2004 Viesselmann et al. ........ 340/675
7,064,282 B2 * 6/2006 Viaud et al. ................... 177/136
7,295,895 B2 * 11/2007 Smith et al. ................... 700/275
7,340,996 B1 * 3/2008 Viaud ..................... A01F 15/08
100/87
7,703,391 B2 4/2010 Duenwald et al.
7,743,699 B1 6/2010 Freeman et al.
8,097,213 B2 * 1/2012 Vierheilig et al. ............ 422/110
8,141,480 B2 * 3/2012 Smith ............................. 100/88
8,326,563 B2 * 12/2012 Kraus ........................... 702/102
8,656,830 B2 2/2014 Kraus
2004/0250703 A1 12/2004 Viaud et al.
2005/0109007 A1 * 5/2005 Hood et al. ..................... 56/341
2007/0101694 A1 * 5/2007 Hood et al. ..................... 56/341
2012/0042792 A1 * 2/2012 Smith ............................... 100/2
2012/0103207 A1 * 5/2012 Kraus ................. A01F 15/0816
100/45
2014/0090903 A1 * 4/2014 Kraus ...................... G01G 9/00
177/1
2014/0090904 A1 * 4/2014 Kraus ...................... G01G 9/00
177/1
2014/0174303 A1 * 6/2014 Posselius et al. ............... 100/76

* cited by examiner 10
22
26
30
24
28
44
30
14
B
12
46B
48
42
20
43
32
41
34
45
40
36
ECU
38
16
46A
18

METHOD FOR ADJUSTING A TARE WEIGHT OF AN AGRICULTURAL BALER TO REFLECT USAGE OF PRESERVATIVE IN TREATING FORMED BALE

CROSS-REFERENCE TO RELATED APPLICATION

This application is a Division of U.S. patent application Ser. No. 12/915,330 filed 29 Oct. 2010, which application is pending.

FIELD OF THE INVENTION

The present invention relates to agricultural balers. More particularly, the invention relates to agricultural balers having bale scales and/or load cells for weighing bales. Specifically, the invention relates to a method of determining the weight of agricultural bales that accounts for differences in indicated weight due to hillsides, slopes etc.

BACKGROUND OF THE INVENTION

It is known to equip agricultural round balers with load cells or other types of scales to determine the weight of the bale. The problem with all known systems is that they do not provide an accurate bale weight when the baler is sitting on an incline such as a hillside. The reason for this problem is that the load cells that are typically mounted in the hitch and/or axles, deflect in proportion to the normal force which is perpendicular to the axle. When the baler is resting on a horizontal plane, the "normal force" and the "force of gravity" are both perpendicular to the axis of the load cell. In this case, the load cells provide an accurate measurement of the bale weight. However, when the baler is paced on a hillside, the "normal force" and the "force of gravity" are not aligned i.e. the "normal force"=(force of gravity)*COS(slope angle). Because of this, the bale weight is underestimated.

While it is possible to mount an inclinometer on the baler to measure the angle of the slope to account for this effect, doing so adds extra cost and complexity into the system.

Accordingly there is a clear need in the art for a method of determining an accurate weight of an agricultural round bale regardless of the angle of inclination.

SUMMARY OF THE INVENTION

It is therefore an object of the invention to provide a method of determining a weight of an agricultural bale formed in a round baler.

It is another object of the invention to provide such a method of determining a weight of an agricultural bale formed in a round baler wherein an accurate weight can be determined regardless of the angle of inclination of the baler.

A further object of the invention is to provide such a method that further accounts for the weight of twine or wrapping material and/or preservative when determining the weight of a bale.

Another object of the invention is to provide such a method that does not require additional hardware and does not add additional complexity to the baler.

Yet another object of the invention is to provide such a method that is compatible with known agricultural baling equipment and techniques.

These and other objects of the invention are attained by a method for determining the weight of an agricultural bale formed in a baler comprising the steps of: determining an empty baler tare weight ($W_t$) while the baler is on a level surface; forming a bale in the baler; determining a full baler weight of the baler and completed bale ($W_f$); calculating, a raw bale weight ($W_r$) wherein $W_r=W_f-W_t$; ejecting the bale from the baler and determining an empty baler weight ($W_e$); calculating a cosine of an angle of a slope, upon which the baler sits (COS A) wherein COS $A=W_e/W_t$; and calculating an actual bale weight ($W_a$) wherein $W_a=W_r$/COS A.

Further objects of the invention are attained by a method for adjusting a tare weight of an agricultural baler to compensate for a reduction in a weight of wrapping material and/or preservative consumed in the formation of a bale comprising the steps of: determining an initial tare weight of an empty baler ($W_t$); determining a specific weight of a wrapping material ($W_{wrap}$) being used in the baler in one of unit weight per unit area for net/film and unit weight per unit length for twine; determining a specific weight of preservative ($W_{pres}$ lbs/ft$^3$) being used in the baler; determining a material width ($M_w$) if $W_{wrap}$ is in unit weight per unit area; determining a completed bale diameter ($B_d$); determining a number of wraps ($N_w$) of wrapping material used on the bale; determining a volume in cubic feet of the preservative ($V_p$) used in the bale; calculating a weight of wrapping material consumed in the bale ($W_n$) wherein one of, $W_n=\Pi*B_d*M_w*N_w*W_{wrap}$ for net/film and $W_n=\Pi*B_d*N_w*W_{wrap}$ for twine; calculating a weight of preservative consumed in the bale ($W_p$) wherein $W_p=W_{pres}$ lbs/ft$^3*V_p$; calculating a new empty baler tare weight ($W_t'$), wherein $W_t'=W_t-(W_n+W_p)$; and, adjusting $W_t$ to equal $W_t'$ prior to a start of a new bale.

In general a method is provided for determining the weight of an agricultural bale that compensates for un-level terrain such as hillsides. The method uses an empty baler tare weight and a full baler weight to determine a raw bale weight. The cosine of the slope upon which the baler sits is then calculated based upon the empty baler weight as it sits and the empty baler tare weight. The cosine of the angle of slope and raw bale weight are then used to determine an actual bale weight. Further steps are provided for compensating in the tare weight of the baler for the weight of wrapping material and/or preservative consumed in the formation of each bale.

BRIEF DESCRIPTION OF THE DRAWINGS

For a complete understanding of the objects, techniques, and structure of the invention, reference should be made to the following detailed description and accompanying drawings, wherein.

DESCRIPTION OF THE PREFERRED EMBODIMENT

Figure 1:
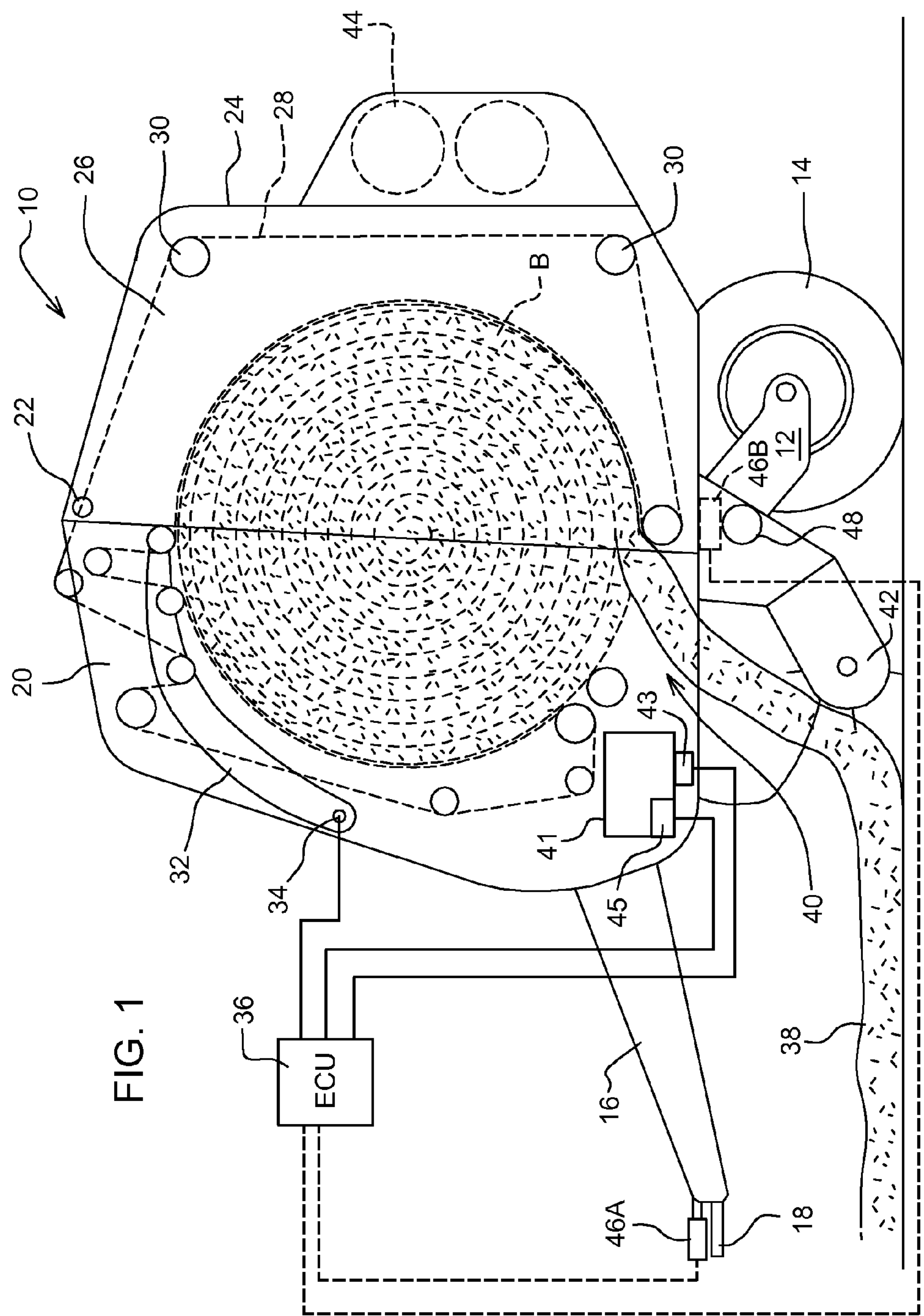
FIG. 1 is an elevational, partially schematic side view of a round baler.
Figure 2:
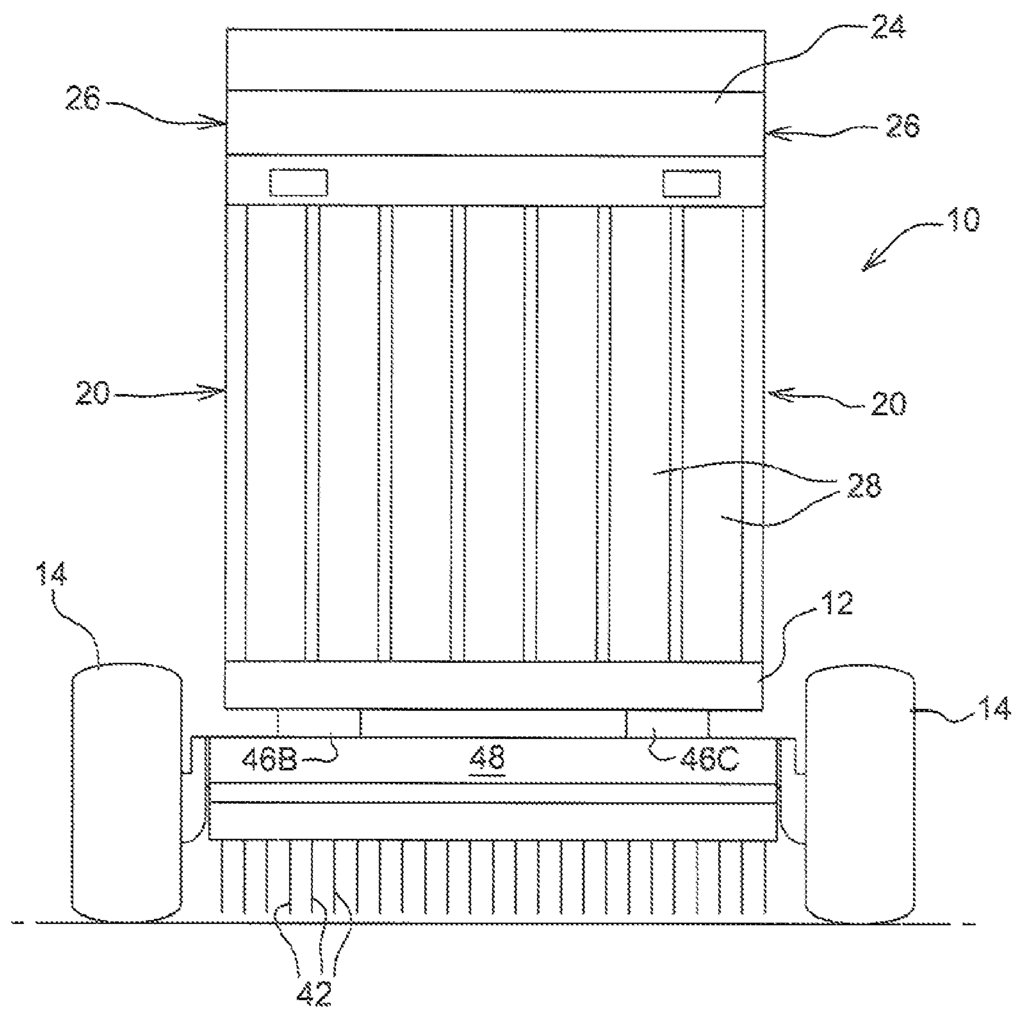
FIG. 2 is a rear view of the round baler of FIG. 1.

Referring now to FIGS. 1 and 2 it can be seen that a round baler is generally designated by the number 10. The baler 10 is conventional in its arrangement and includes a main frame 12 supported on a pair of ground wheels 14. A draft tongue 16 has a rear end joined to the frame 12 and has a forward end defined by a clevis arrangement 18 adapted for being coupled to a towing vehicle (not shown). A pair of upright side walls 20 are fixed to the main frame 12 and define forward regions of opposite side walls of a baling chamber. Mounted for pivoting vertically about a horizontal pivot arrangement 22 located at an upper rear location of the side was 20 is a discharge gate 24 including opposite upright side walls 26, which define opposite sides of a rear region of the baling chamber. A gate cylinder arrangement (not shown) is coupled between the main frame 12 and the opposite side walls 26 of the discharge gate 24 and is selectively operable for moving the discharge gate 24 between a lowered baling position and an opened discharge position. The baler 10 is of a variable size chamber design and thus comprises a plurality of longitudinally extending side-by-side belts 28 supported on a plurality of rollers 30 (only a few of which are shown). A bale forming chamber is defined by the sidewalk 20, 26, the rollers 30 and the belts 28.

As mentioned previously, the baler 10 illustrated is a variable chamber design, wherein crop is rolled up in a spiral fashion in a nip formed between oppositely moving adjacent loops of belts 28. The space between adjacent loops of belts 28 grows as the forming bale B grows larger. Accordingly, a belt tensioning device 32 is provided to take up slack in the belts 28 as needed. Thus the position of the tensioning device 32, at any given time, is an indication of the size of the bale B at that time. A bale diameter sensor 34 in the form of a potentiometer is affixed to the pivot point of the tensioning device 32 and thus provides an electrical signal correlating with bale diameter to an Electronic Control Unit (ECU) 36. The ECU 36 is provided for electronically controlling and monitoring a number of functions of the baler 10. For example, the ECU 36, in addition to monitoring bale size and other functions, can further be adapted for triggering a twine or wrapping cycle, opening the discharge gate, initiating bale discharge, controlling the application of preservative to the bate and for communicating crop moisture content and other information to the operator.

In its general operation the baler 10 is drawn through a field by a prime mover (not shown) attached to the tongue 16. Crop material 38 is fed into a crop inlet 40 of the bale forming chamber from a windrow of crop on the ground by a pickup 42. If desired, preservative may be applied to the crop material 38. This may be done by providing the baler with a preservative receptacle 41 of a known volume coupled to a distribution device 43 which is coupled for being controlled by the ECU for applying the contained preservative to the crop material 38 and hence to the bale B, noting that an appropriate sensor 45, such as a material level sensor, or other means, can be associated with the preservative in the receptacle 41 and/or distribution device 43 for determining the volume of preservative used for each bale and communicating this information to the ECU where the volume of preservative used NO and the weight per unit volume of the particular preservative used ($W_{pres}$) (a known value previously stored in the ECU), can be used by the ECU to determine the weight of the preservative ($W_p$). In the baler 10, the crop material 38 is rolled in spiral fashion, as described above, into the cylindrical bale B. Upon completion, the bale B is wrapped with twine, net wrap or other appropriate wrapping material from a wrapping arrangement 44 and is discharged by actuation of gate cylinders that open the gate 24 permitting the completed bale B to be discharged from the baler 10 onto the ground.

With continuing reference to FIGS. 1 and 2, it can be seen that the baler 10 is further provided with one or more load cells 46 for sensing a weight of the bale during and after bale formation in the baling chamber. More particularly, the baler 10 can be provided with a load cell 46A on the tongue 16 of the baler 10 adjacent to the clevis 18. Further, as shown in FIG. 2, the baler 10 can be provided with load cells 46B and 46C which are interposed between the baler frame 12 and the axle 48. Accordingly, the load cells produce a signal varying with their deflection, thereby providing an indication of bale weight. These signals are transmitted by a wired or wireless connection to the ECU 36.

Round balers of the type described above are unique in their operation in that the bale chamber is filled with hay to form a bale, and when the bale is finished the chamber is emptied. Because of this, it is possible to calculate the true weight of the bale on hillsides without the need and expense of a inclinometer. The novel methods for calculating the true weight of the bale by accounting for inclination are set forth in more detail below.

It is first necessary to determine, in advance, the weight of the empty baler while the baler is on a level surface. This EMPTY BALER TARE WEIGHT ($W_t$) is then recorded in the ECU. Upon the completion of a bale, the baler is again weighed to determine the weight of the baler plus the weight of a full bale. It should be noted that the completion of the bale can be sensed by monitoring the gate position through the use of an appropriate sensor. For example when the gate is first opened the bale, still on board the baler, is complete. When the gate is closed again the bale has then been ejected and the baler is empty. This FULL BALER WEIGHT ($W_f$) is also recorded in the ECU. The ECU can then determine the RAW BALE WEIGHT ($W_r$) by subtracting $W_t$ from $W_f$. Then $W_r$ is also recorded in the ECU. The full bale is then ejected from the baler and the baler is weighed again to determine the EMPTY BALER WEIGHT ($W_e$) as the baler sits, which is also recorded in the ECU. The ECU then determines the COSINE OF THE SLOPE (Cos A) or angle of inclination by dividing $W_e$ by $W_t$, both of which were previously stored in a memory of the ECU. The ACTUAL BALE WEIGHT ($W_a$) is then determined in the ECU by dividing $W_r$ by Cos A. Then $W_a$ can be communicated by the ECU to the operator by means of an appropriate display device.

Figure 3:
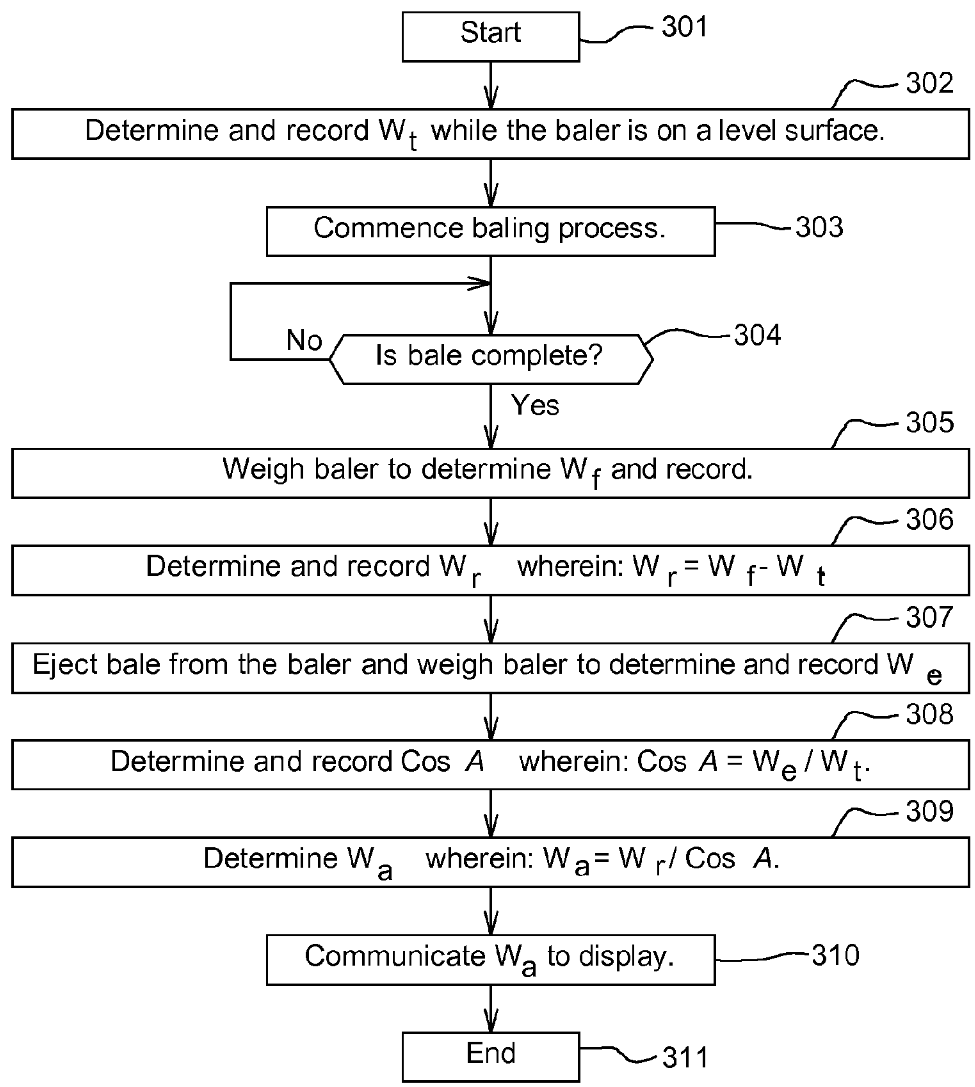
FIG. 3 is a flowchart illustrating the logic of a first embodiment employed by the bale weight determining method of the invention.

The steps for the logic employed by the ECU in determining the actual bale weight are illustrated in the flow chart of FIG. 3. More particularly, after the start at 301 the empty baler is at 302 tared on a level surface to determine $W_t$ and $W_t$ is then stored in the ECU. Once the $W_t$ value has been determined and stored it should not change until such time as the baler is modified in some way as to change its tare weight. However, it is recommended that in order to reduce error due to extraneous factors such as accumulation of debris etc. the baler should be re-tared periodically, for example, approximately every twenty bales. At 303 the baling process is commenced. At 304 the logic queries whether the bale is complete. If at 304 the answer is no, then the logic loops until such time that the answer is yes. If at 304 the answer is yes, then the full baler is weighed at 305 to determine $W_f$, and $W_f$ is then recorded. Next at 306 the ECU calculates and records $W_r$. At 307 the bale is ejected from the baler and the baler is re-weighed to determine and record $W_e$. Next at 308 the ECU calculates and stores Cos A. Then the ECU calculates and stores $W_a$ at 309. At 310 the ECU communicates $W_a$ to an operator display prior to the end at 311. Thus it is possible to determine an actual bale weight wherein the inclination is compensated for without the need for additional hardware such as an inclinometer.

On round agricultural balers some twine or net/film material is necessarily consumed for each bale. Thus the EMPTY BALER TARE WEIGHT ($W_t$) which includes the weight of the spools of twine or rolls of net/film material is reduced with each completed bale, by the weight of the net or twine applied to the bale. This weight reduction is directly proportional to the amount of net or twine consumed, which is, in turn, related to the bale diameter and number of wraps of twine or net applied to the bale. Thus if it is desired to account for this reduction in tare weight it will be necessary to re-tare the baler from time to time. This can be done periodically during the baling operation if conditions permit, e.g. if the baler can be reweighed on a level surface. However, it is possible to account for this reduction in tare weight each time a bale is made by subtracting the weight of the net or twine applied to each bale from $W_t$ each time a bale is made. The method for determining the NEW EMPTY BALER TARE WEIGHT ($W_t'$) follows. First it is necessary to weigh the baler on a level surface as described above to determine an initial ($W_t$). It is also necessary to record in the ECU the SPECIFIC WEIGHT OF THE WRAPPING MATERIAL ($W_{wrap}$) in lbs/ft$^2$, or for twine, in lbs/ft, and the WRAPPING MATERIAL WIDTH ($M_w$) based upon the type of wrapping material being used. It should be noted that on balers using twine systems the width of the wrapping material is not applicable. Then, when a bale is complete, the BALE DIAMETER ($B_d$) is determined from the bale diameter sensor. ($B_d$) is then recorded in the ECU. The NUMBER OF WRAPS ($N_w$) of net or wrapping material used is also determined and recorded in the ECU. It should be noted that for twine systems, $N_w$ should include the total number of wraps for all twines used across the baler. $N_w$ can be determined for example, through the use of appropriate sensors or by calculating the RPM of the bale and the time in which the wrapping mechanism is activated, as is well known in the art. The WEIGHT OF THE WRAPPING MATERIAL CONSUMED BY THE BALE ($W_n$) can then be calculated in the ECU by one of the following equations:

for bales having net or wide wrapping material:

$$W_n=\Pi*B_d*M_w*N_w*W_{wrap}$$

for bales having twine:

$$W_n=\Pi*B_d*N_w*W_{wrap}$$

The NEW EMPTY BALER TARE WEIGHT ($W_t'$) is then determined by subtracting $W_n$, calculated above, from $W_t$. Then $W_t$ can be adjusted to equal $W_t'$ in the ECU and so on for each subsequent bale.

Figure 4:
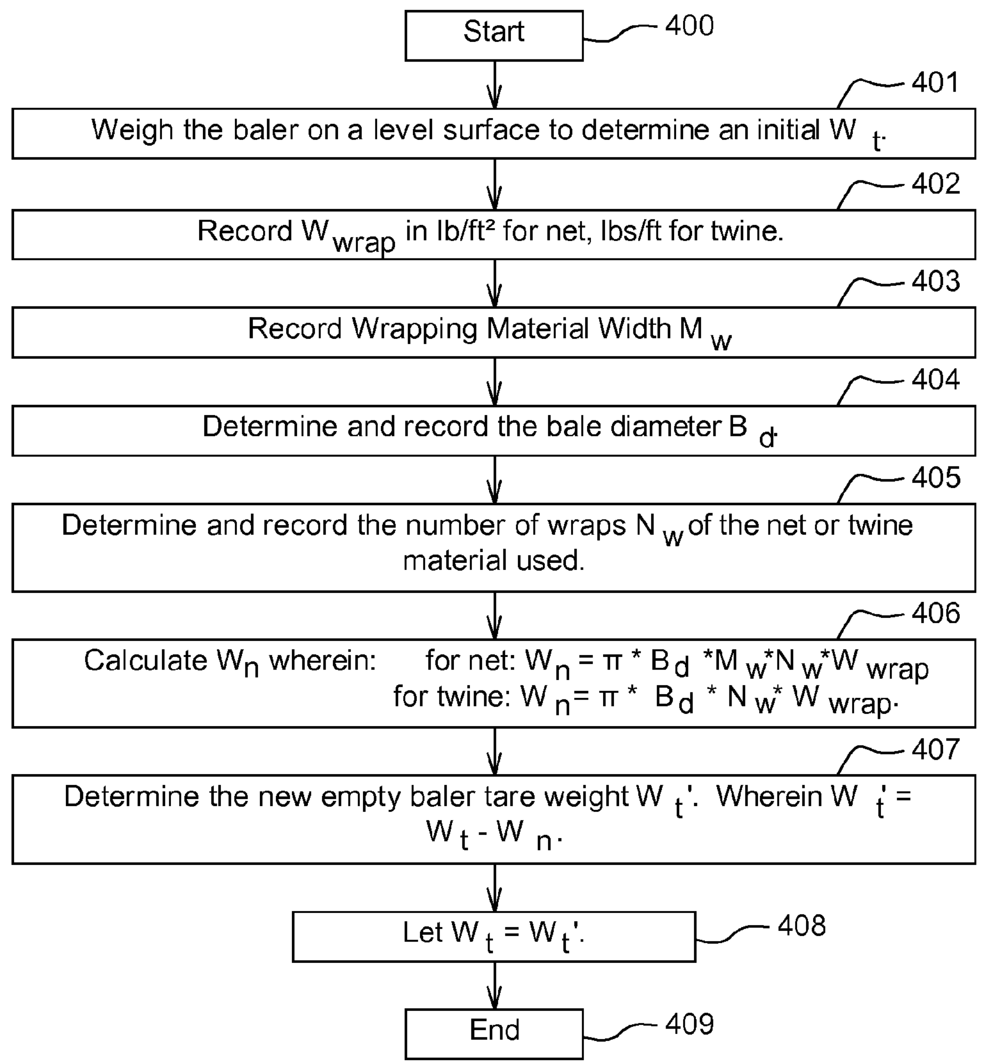
FIG. 4 is a flowchart illustrating the logic of a wrapping material weight compensation method of the invention; and, FIG. 5 is a flowchart illustrating a second embodiment employed by the bale weight determining method of the invention.

The above method is shown as a flowchart in FIG. 4. After the start at 400 the baler is weighed on a level surface to determine an initial $W_t$ 401. At 402 $W_{wrap}$ is input into the ECU. Similarly $M_w$ is input at 403. Upon completion of a bale, $B_d$ is determined and recorded in the ECU at 404. Then at 405 the number of wraps of material $N_w$ is determined and recorded. At 406 the ECU calculates $W_n$. The new empty baler tare weight $W_t'$ is the calculated at 407. At 408 the initial tare weight $W_t$ is adjusted to equal the new tare weight $W_t'$ prior to the end at 409.

A similar method can be used to calculate a new tare weight for the baler due to a reduction in weight as a result of the consumption of preservative used in the production of a bale. This weight reduction is directly proportional to the volume of preservative used in the production of each bale. In this case the logic of the ECU can be adjusted by recording in the ECU the SPECIFIC WEIGHT OF THE PRESERVATIVE ($W_{pres.}$) in lbs/ft$^3$ to utilize a weight per unit volume of preservative and then determining, via appropriate sensors or other means, the volume of preservative used for each bale. Once the weight per unit volume and volume consumed are known the tare weight can further be adjusted to compensate for the reduction. Thus, in the flowchart of FIG. 4, an additional step would occur between steps 403 and 404 wherein the specific weight in lbs/ft$^3$ of the preservative ($W_{pres.}$) to be incorporated in the bale B would be recorded; and further steps would be added between steps 406 and 407 wherein the volume of the preservative used ($V_p$) would be determined from the information gathered by the sensor 45 and the weight of the preservative used $W_p$ would be calculated using the equation:

$$W_p \leq W_{pres}*V_p$$

THE NEW EMPTY BALER TARE WEIGHT ($W_t'$) is then determined by subtracting the sum of $W_n$ and $W_p$ from $W_t$. Then $W_t$ can be adjusted to equal $W_t'$ in the ECU and so on for each subsequent bale.

Figure 5:
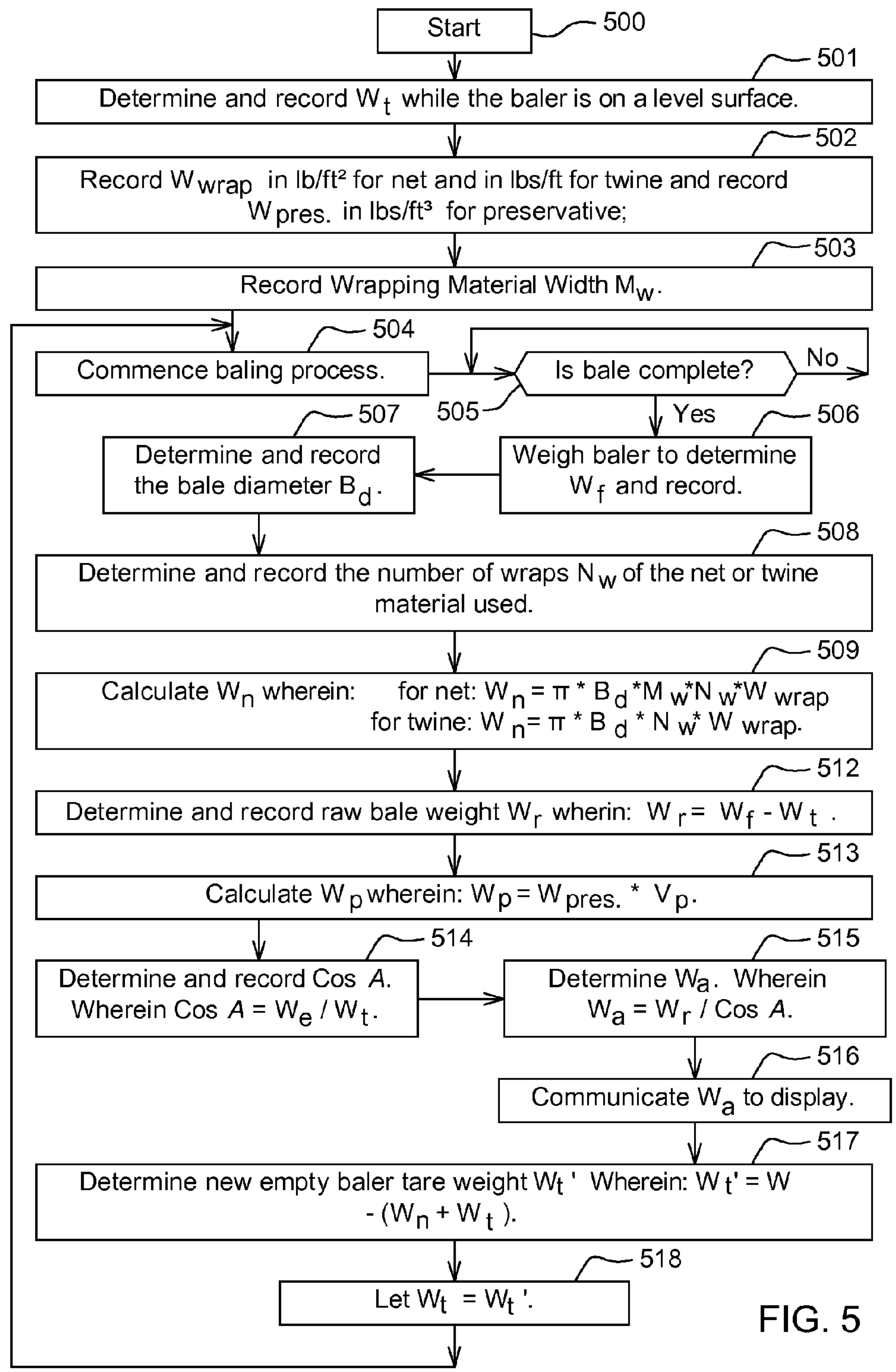

The logic outlined in FIGS. 3 and 4 are integrated in the flowchart of FIG. 5 wherein the complete logic for weighing a bale while compensating for slope and allowing for tare weight reduction due to wrap material and preservative usage is illustrated. More particularly, after the start at 500 the empty baler is, at 501, weighed on a level surface to determine $W_t$ and $W_t$ are then stored in the ECU. At 502, $W_{wrap}$ and $W_{pres.}$ are input into the ECU. Similarly $M_w$ is input at 503. At 504 the baling process is commenced. At 505 the logic queries whether the bale is complete. If at 505 the answer is no, then the logic loops until such time that the answer is yes. If at 505 the answer is yes, the full baler is weighed at 506 to determine $W_f$, and $W_f$ is then recorded. Then $B_d$ is determined and recorded in the ECU at 507. At 508 the number of wraps of material $N_w$ is determined and recorded. Next at 509 the ECU calculates $W_n$. At 510 the volume of the preservative $V_p$ used is determined and at 511 the weight of the preservative used Wp is calculated wherein: $W_p=W_{pres.}*Vp$. At 512 the ECU calculates and records $W_r$. At 513 the bale is ejected from the baler and the baler is re-weighed to determine and record $W_e$. Next at 514 the ECU calculates and stores Cos A. Then the ECU calculates and stores $W_a$ at 515. At 516 the ECU communicates $W_a$ to an operator display. The new empty baler tare weight $W_t'$ is then calculated at 517. At 518 the initial tare weight $W_t$ is adjusted to equal the new tare weight $W_t'$ prior to the start of a new bale.

In view of the foregoing it should now be apparent that it is possible to determine an accurate bale weight that compensates for hillside operations and further compensates for wrapping material usage, without the need for additional hardware in the form of inclinometers etc. It should also be apparent that the above described methods are compatible both with many known round baler types and conventional baling techniques.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A method for adjusting a tare weight of an agricultural baler to compensate for a reduction in a weight of preservative material consumed in the formation of a bale comprising the steps of:

determining an empty baler tare weight ($W_t$) while the baler is on a level surface;

determining a specific weight of preservative material ($W_{pres}$) being used in the baler in weight per unit volume;

forming a bale in the baler;

determining a full baler weight of the baler and completed bale ($W_f$);

calculating a raw bale weight ($W_r$) wherein $W_r = W_f - W_t$, determining a volume of the preservative ($V_p$) consumed in the production of a bale;

calculating a weight of the preservative material ($W_p$) consumed in the production of the bale wherein $W_p = W_{pres} * V_p$;

ejecting the bale from the baler and determining an empty baler weight ($W_e$);

calculating a cosine of an angle of a slope upon which the baler sits (COS A) wherein COS $A = W_e / W_t$;

calculating an actual bale weight ($W_a$) wherein $W_a = W_r /$ COS A;

calculating a new empty baler tare weight ($W_t'$), wherein $W_t' = W_t - W_p$.

* * * * *